United States Patent [19]

Noguchi

[11] 3,787,269

[45] Jan. 22, 1974

[54] APPARATUS FOR MAKING A FLEXIBLE CLOSURE

[76] Inventor: Tanashi Noguchi, Seisan Nippon Sha Ltd. New Kohjimachi Bldg. No. 3 5-chome, Tokyo, Japan

[22] Filed: Sept. 7, 1971

[21] Appl. No.: 178,086

[52] U.S. Cl................ 156/498, 156/244, 156/500
[51] Int. Cl............................................. B32b 31/30
[58] Field of Search....... 156/91, 92, 244, 282, 322, 156/498, 499, 500; 150/3

[56] References Cited
UNITED STATES PATENTS

| | | | |
|---|---|---|---|
| 3,421,960 | 1/1969 | Arbit................................... | 156/500 |
| 3,116,194 | 12/1963 | Looser................................. | 156/500 |
| 3,462,332 | 8/1969 | Goto................................... | 156/244 |
| 3,532,571 | 10/1970 | Ausnit................................. | 156/500 |
| 3,075,868 | 1/1963 | Long.................................... | 156/282 |
| 3,575,762 | 4/1971 | Goehring et al..................... | 156/244 |
| 3,543,379 | 12/1970 | Naito................................... | 156/91 |

*Primary Examiner*—Alfred L. Leavitt
*Assistant Examiner*—Caleb Weston
*Attorney, Agent, or Firm*—Carlton Hill et al.

[57] ABSTRACT

A mechanism and method for attaching strips such as those having an interlocking profile thereon to a laminated sheet of plastic wherein the sheet is preheated by passing it over a heated roller and then passed over a heated joining roll having a nip formed with a pressure roll and feeding a freshly extruded hot strip into the nip and onto the sheet and thereafter applying localized cooling after the strip.

14 Claims, 3 Drawing Figures

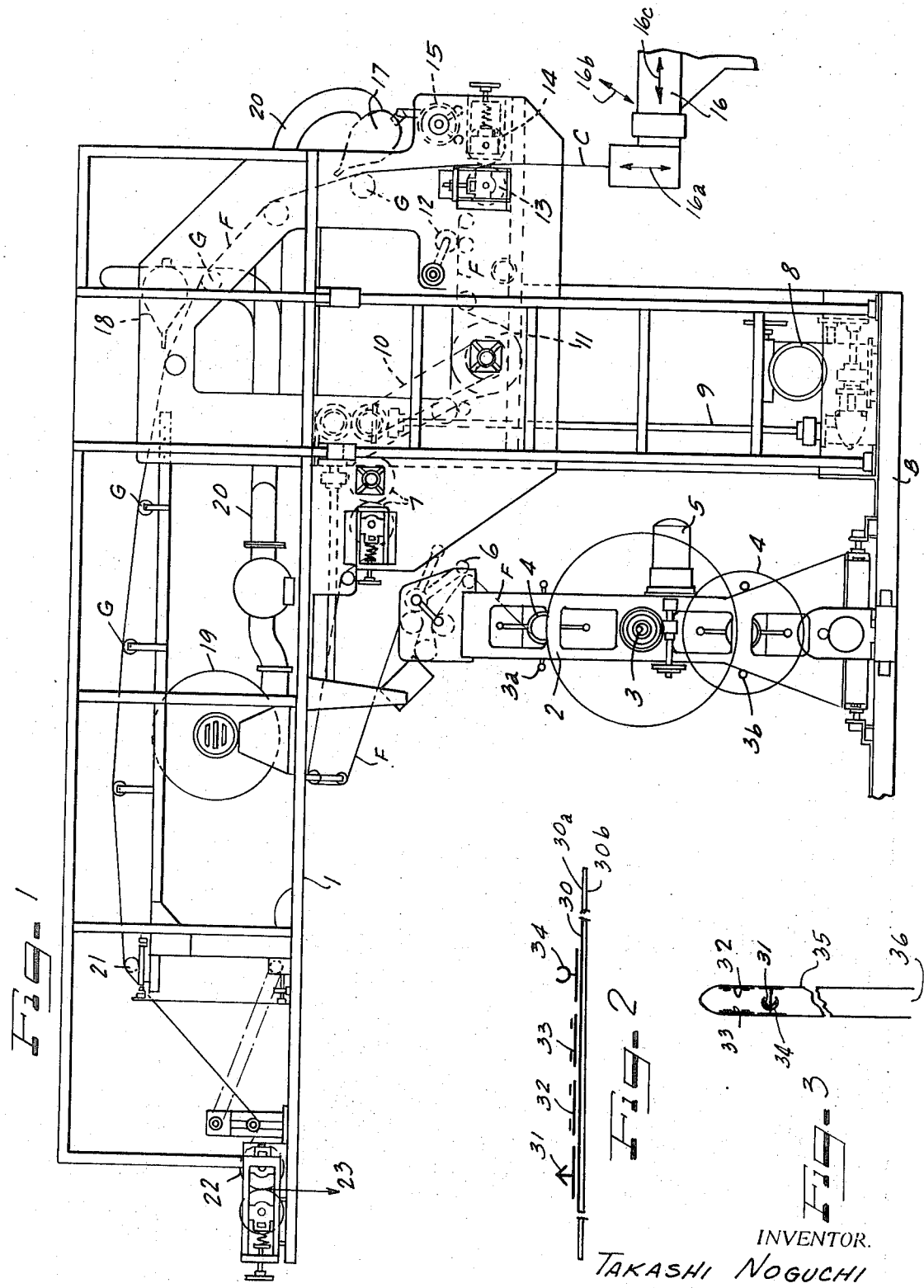

3,787,269

APPARATUS FOR MAKING A FLEXIBLE CLOSURE

BACKGROUND OF THE INVENTION

This invention relates to a method and apparatus to join plastic strips of various interlocking fastener means to laminated film continuously and automatically so as to produce therefrom reclosable bags made from said laminated film and fastener strips attached thereto. Conventional reclosable plastic bags featuring various types of plastic fasteners have hereto been used as one of the necessities of modern living because they are, as indicated, reclosable and also very convenient. However, the above mentioned conventional plastic fastener bag consists of a simple combination of fastener means and bag bodies, both of which are formed integrally and at the same time of a single plastic or resin material, for example, polyethylene or polypropelene, because of the requirements of the manufacturing method.

Such reclosable bags formed of a single material are suitably used for the purpose of getting their contents in and out or preserving them therein, but since their material is made from a single sheet and is not absolutely airtight, their use as bags for such goods as medicines or foods, the quality of which might be affected by air or moisture, is not appropriate.

Therefore, in the case of packaging goods where it is necessary to protect their quality, it is desirable that bag bodies be formed of more air impervious laminate films, which may be formed of a lamination of cellophane and/or paper and/or aluminum, etc. together with a resin film such as polyethelene or other plastic. It is nearly impossible in view of the existing production equipment and its operation to produce laminated films and fastener means by the method of extruding both the laminated film and the fastener means at the same time, as in the manufacturing of reclosable bags formed of a single material. Further, the method of laminating another different film on the already formed fastener film also is not desirable because when both are attached together the pressure added thereon by the heating and pressure rolls causes changes in the structural form of the fastener means to take place. Therefore, the method of joining fastener means on to laminated film formed separately, is the most appropriate, in which case there are two methods of proceeding: These are: the use of a binding agent or the method of joining by fusion through heating. The method of joining fastener strips, which keep the fusing heat required for joining, by attaching them soon after they are extruded, to the already separately formed laminated film, which itself is reheated, has a weak point in that the completed bags lose value as commercial products, due to the unequal cooling that results from the difference of thickness between the fastener profiles and their web portions and the film to which they are attached, and which produces shrink marks and/or wrinkles on the film near and adjacent the fastener strips. In the case of laminated plastic and aluminum film it also very often happens that the fusing and combining of the film with the fastener is not accomplished perfectly because of the difference between the resin material and the aluminum in their capability of maintaining heat, from the time of heating to the point of joining. On account of various difficulties in manufacturing methods full barrier bags consisting of fastener strips attached to laminated film have never been developed up to now, though there are many bags without fastener means made from such laminated film.

In view of the above problems, it is an object of this invention to provide the methods and apparatus to fuse and join the webs of the fastener strips to laminated films continuously and automatically.

A feature of this invention is to prevent the laminated film from shrinking and to keep the construction of the fastener strips within required sizes.

This is done by providing at an appropriate place a heating roll, which gives adequate heat to the laminated film and by then joining the fastener strips which have just been extruded and still retain sufficient extrusion heat, to the laminated film, heated to a fusion temperature by the said heating roll, and thereafter by maintaining the desired differential cooling by emphasizing the cooling of the fastener strips, and their attached webs, which due to their thickness would normally take longer to cool. An embodiment of this invention will now be described, by way of example, with reference to the accompanying drawings.

DESCRIPTION OF THE DRAWINGS

FIG. 1 is a schematic side elevational view of a mechanism constructed and operating in accordance with the present invention;

FIG. 2 is a schematic sectional view showing a laminated sheet with fastener strips attached, as a product produced in accordance with the present invention; and FIG. 3 is a schematic sectional view of a bag formed from the sheet of FIG. 2.

DESCRIPTION OF THE PREFERRED EMBODIMENTS

FIG. 1 shows a machine body 1 containing therein an apparatus according to this invention, which is attached to a base B. 2 is an apparatus for the unwinding of a roll of film and also fixed to the base B. This apparatus for unwinding a roll of film 2 has a main shaft 3 which can be revolved 180° by an electric motor 5 and the said main shaft 3 is provided with an arm, which is not shown in this drawing, with both ends of this arm being further provided with revolving frames 3a and 3b for winding up the laminated film roll 4 which is separately made.

A tension control roll 6 provided above the apparatus for unwinding the roll of film 2, gives adequate tension to the film moving through, after unwinding. Film F passing through this tension control roll 6 is pulled out by the rotation of a take-up roll 7 installed in the machine body 1. Film F is then transferred from the said take-up roll to the heating chamber.

In this heating chamber, the heating roll 11 is installed in the machine body 1, and rotated by a motor 8, via a transmitting axis 9 and a chain 10. The said heating roll 11 rotates and is equipped with a heating system that will allow it to be heated to a desired temperature. Therefore, Film F after being transferred from the above mentioned take-up roll 7 is put on the heating roll 11 and is heated to the desired temperature by contact with the heating roll 11. Now, the heated film F is transferred to a joining roll 13 and is joined with fastener strips C. Further, the above mentioned joining roll 13 is also provided with a heating source and if the film is not fully heated by the heating roll or loses some of its heat while it is being transferred to the joining roll, from the heating roll, the film can be reheated to the desired temperature by said joining roll 13.

A weakened tear line is formed in the laminated film by thinning same or by perforating it with a cutter 12 stationed between the above mentioned heating roll 11 and the joining roll 13. Below the joining roll 13 an extruder 16 that is movable back and forth against the surface of said roll, is provided, and fastener strips C are extruded therefrom and joined with film F passing over said joining roll 13 at said joining roll. Thus, the film F is fused with the fastener strips by the joining roll 13 and is then transported over several guide rolls G provided in the machine body 1 to a winding station where it is wound up.

Further, while being transported over the guide rolls G, the portion of the film F that joins the fastener C is strongly cooled by cool air blown out of cooling devices 17 and 18 located near the joining roll. The said cool air is supplied to cooling devices 17 and 18 through a duct 20 from air conditioning equipment 19 provided in the machine body 1.

The drawing also shows a handle 15 which moves a press roll 14, a roll 21 that controls the course by which film F is transferred, and a take-up roll 22. Next, the operation of the above mentioned structure is explained as follows:

The above film having been pulled out of the apparatus 2 used for unwinding a roll of film, is heated before it is combined with the fastener strip C by a joining roll 13. In the case where both the film and the fastener strips are made from the same resin material, it is not necessary that both of them are heated by the heating roll 11 because both of them can be perfectly fused and combined with each other by simultaneous extrusion.

But, in the case of laminated film it is impossible, as mentioned previously to extrude integrally at the same time both the film and the fastener strips. When the fastener strips are fused and combined continuously with the already formed laminated film, which is in cooled condition, since it was formed long before, the film must be reheated to the desired temperature by a heating roll 11, as the said film has lost a temperature suitable for fusing and this must now be delivered to it. However, when the above mentioned film F is heated an effective method of handling the film material is required. For example, in order to produce economically, it is necessary to have fast speeds of film passage and of fastener strip extrusion, as well as to make the film suitably hot so as to fuse with the fastener strips as quickly as possible, and accordingly, it is necessary to raise the temperature of the rolls 11. But, some laminated films, for example, polyethelene and cellophane have a little air left between laminations, which will expand with the heat and create a number of bubbles between the laminations of the film. These deteriorate the quality of the film and must be prevented.

Therefore, in order to prevent the surface of the film F from being damaged it is necessary to obtain not only the right temperature for joining the film to the strips, but also a temperature that will prevent the air between the laminations from expanding with heat and maintaining at the same time a rolling speed of the roll that will not impair the efficiency of production.

In some instances, the laminated film needs to be in contact with the heating roll for a longer time, but the rolling speed of the roll should not be decreased or the efficiency of the production will be affected. Also, some film laminations, cannot be combined with the fastener strips because the heat already given to the film is lost before the film can be transported to the joining roll. Therefore, in order to avoid the above mentioned problems, joining roll 13 has its own heating source, which provides a secondary heating of said film, and makes up for the deficiency in the heating of the heating roll 11, so that film F may be moved at high speed and may be given a temperature suitable for fusing with the fastener strips. Especially for those laminated films that have poor heat conduction and heat preservation, a better and more efficient heating can be delivered to such films by having a first heating by heating roll 11 and a secondary heating by joining roll 13. Thus, Film F is fused and combined with the fastener strips C at joining roll 13. Through the above mentioned process, though both film and fastener can be combined with each other perfectly, it is often difficult to obtain the desired size of fastener that is suitable for the strength of the film to which it is being attached. Hence, bags manufactured without considering this point are not commercially salable. Therefore, the size of the fastener is related to the potential strength of the film. For example, a bag body made from a laminated film with weak tensional strength that has a fastener with a heavy interlocking element is not desirable, because of the resistance of the fastener from being separated when the bag is opened is stronger than the film adjacent the fastener, so that the film is elongated and damaged, and the bag bodies form is changed.

Therefore, when the film and the fastener are combined, it is necessary to pay careful attention to the above mentioned matter. In order that a bag is provided with the right combination of film and fastener that eliminates the problems that reduce its commercial value, the extruder producing the fastener strips, or the orifice part thereof, should be movable up and down and/or back and forth towards the surface of the joining roll, so that the distance between the opening of said extruder die plate and the joining roll may be adjustable. The movement is indicated by the arrowed line 16a.

At the same time, it should also be possible to select the location point where the film is attached to the fastener by moving the die plate or the orifice part of the extruder to both the right and the left side and in parallel to the joining roll, as shown by the arrowed line 16b. Movement in the direction 16c, normal to the axes of the rolls 13 and 14, is also possible. Preferably, only the die portion of the extruder unit is movable for adjustment. The film F with the fastener C made by the above method is then passed through a cooling process. When both the fastener strips and the film F are cooled to the same temperature at the same rate, uneven shrinking and wrinkles will appear on the surface of the film adjacent the fastener and the resultant bags will become imperfect products. This is because, in equal cooling, the rate of cooling is slower in the fastener strip C and around their web portion than in their laminated film, and is due to the fastener strips C and their webs being thicker than the portion of the film to which they are attached. Therefore, in equal cooling the laminated film with its thin plastic layer is cooled at the higher rate than the thick portion of the fastener and its related web and different shrinking takes place between the former and the latter. This results in noticeable shrink marks and/or wrinkles on the surface of the film adjacent the web of the fastener C.

In order to prevent such a situation, it is necessary to cool both the fastener and the film at different rates so as to provide more cooling to one than to the other. Therefore, according to this invention the following cooling equipment is provided:

Partial cooling is carried out, that is to say, cool air is blown only against the fastener strips C and their web portions by cooling equipment 17 and 18. Accordingly, only the portions of film F where the fastener webs are attached are cooled as they move over the guide rolls G and are thereby kept at almost the same temperature as the other adjacent thin portion of the film against which no fastener heat is applied. Thus, it is possible to prevent shrink marks and wrinkles from being created on the film. Thus, also, according to the method and apparatus for this invention, it is now possible to fuse and combine fastener strips, etc. with laminated films continuously, automatically and at high speeds, and to mass produce and supply inexpensive reclosable good quality plastic bags made from different laminate barrier films having a greater range of protection for the products contained therein, though this was not technically feasible heretofore. Further, since the main structure of this apparatus consists of a mechanism which includes in specific combinations a heating roll, a heated joining roll, special cooling equipment and a special method of moving the extrusion equipment, economical production of laminated reclosable bags is now possible. Since the preheating necessary to fuse and combine fasteners to laminated film can now be suitably given to film, the said apparatus is applicable to all kinds of laminate films. In addition, the above mentioned special cooling prevents the film to which the fastener is attached from abnormally shrinking or wrinkling. These are the features of this invention.

FIG. 2 illustrates a sheet 30 of the type made by the mechanism above described. This is a sheet which can be doubled at its center, or in other words, folded over on itself, and seamed along the edges to form a bag with an open bottom 36. The profile strips are located so that when the bag is doubled over, they are within the bag, as shown in FIG. 3. Also attached to the sheet 30 are reinforcing strips 32 and 33 which have aligned ribs extending therealong, and these ribs will guide the tear formed in the bag when the top is torn off. In order to use the bag, the top will be torn off to leave flanges so that the interlocking rib and groove elements may be pulled apart.

The film sheet 30 may be formed of thin plastic or may be a lamination having several layers. For example, the inner layer 30a may be of thin plastic film and the outer layer 30b may be of foil or paper or other material which provides stiffness or other properties to the bag. While the example of FIGS. 2 and 3 illustrates a sheet with profile strips 31 and 34 and also reinforcing strips 32 and 33, it will be understood that the mechanism of FIG. 1 may be utilized to apply various types of strips, such as profile strips alone.

I claim as my invention:

1. A mechanism for forming a sheet with shaped profile strip means laminated thereon comprising,
   means supplying a continuous sheet of plastic film,
   a heated roller over which the film travels,
   means for heating the roller,
   means for extruding a heated continuous plastic strip having a shaped profile on the outer surface, said extruder positioned so that the heated strip is applied to the heated film on the roller with its inner surface contacting the film.

2. A mechanism for forming a sheet with strip means thereon constructed in accordance with claim 1 and including means for cooling the strip independently of the sheet after said joining zone.

3. A mechanism for forming a sheet with strip means thereon constructed in accordance with claim 1 and including first and second sequential coolers positioned after said joining zone and arranged to direct a flow of cooling fluid at sequential positions onto said strip independently of the sheet.

4. A mechanism for forming a sheet with strip means thereon constructed in accordance with claim 1 and including means for forming a tear line positioned between the heated roller and said joining zone and forming a tear line along the sheet.

5. A mechanism for forming a sheet with strip means thereon constructed in accordance with claim 1 and including cooling means positioned after said joining zone for directing a flow of cooling fluid onto said strip and onto the area of the sheet immediately adjacent the strip.

6. A mechanism for forming a sheet with strip means laminated thereon in accordance with claim 1 wherein said extruding means includes means for extruding a plurality of heated strips and said strips are applied to the heated film in said joining zone.

7. A mechanism for forming a sheet with shaped profile strip means thereon comprising,
   means supplying a continuous preformed sheet of plastic film,
   means for receiving and heating the preformed sheet of film,
   a joining roll over which the sheet travels,
   means for heating said joining roll, and
   an extruder for extruding a continuous plastic strip having a shaped profile on the outer surface in position for feeding the strip onto the sheet on said joining roll with the inner surface engaging the sheet.

8. A mechanism for forming a sheet with strip means thereon in accordance with claim 7 wherein the structure includes means for adjusting the position of the extruder toward or away from the joining roll whereby the heat retained within the plastic strip received from the extruder is varied when the strip reaches the joining roll.

9. A mechanism for forming a sheet with strip means thereon in accordance with claim 7 including means for heating the joining roll.

10. A mechanism for forming a sheet with strip means thereon constructed in accordance with claim 7 including means for adjusting the position of the extruder die opening relative to the joining roll.

11. A mechanism for forming a sheet with strip means thereon constructed in accordance with claim 7 wherein said extruder is adapted for extruding a plurality of continuous plastic strips in position for feeding the strips onto the sheet at the joining zone on the roll.

12. A mechanism for forming a sheet with strip means thereon constructed in accordance with claim 7 including means for adjusting the position of the extruder relative to the joining roll.

13. A mechanism for forming a sheet with strip means thereon constructed in accordance with claim 12 wherein the extruder is adjustable in a direction parallel to the axis of the joining roll so that said strip can be joined to the film at varying distances from the film edges.

14. A mechanism for forming a sheet with strip means laminated thereon comprising, means supplying a continuous sheet of plastic film,
a heated roll over which the film travels,
means for heating said roll,
means for extruding first and second heated continuous plastic strips having mating interlocking profiles thereon,
said extruding means positioned so that said profile strips are applied to the heated film on said heated roll,
and means applying a tear strip means between said profile strips.

* * * * *